Nov. 20, 1956  L. CLAPS  2,771,220
CONTAINER WITH ROLLER TYPE COLLAPSIBLE TUBE
Filed June 16, 1954

Louis Claps
INVENTOR.

BY *[signatures]*
Attorneys

United States Patent Office 2,771,220
Patented Nov. 20, 1956

2,771,220

CONTAINER WITH ROLLER TYPE COLLAPSIBLE TUBE

Louis Claps, Levittown, N. Y.

Application June 16, 1954, Serial No. 437,109

3 Claims. (Cl. 222—100)

This invention relates to the class of containers, and more particularly to a novel composite container especially adapted for maintaining volatile substances, such as paint, varnish, and the like substantially air-free so that a film or skin will not be formed on the substance as is usual when deposited in a partially filled container.

The primary object of the present invention resides in the provision of a novel container having means for collapsing an inner receptacle so that the container can be at all times completely filled, thereby eliminating any air from within the container.

The construction of this invention features an inner receptacle carried by an outer upper receptacle which, in turn, is carried by an outer lower receptacle. The upper outer receptacle and the inner receptacle may be lifted so that the inner receptacle can be collapsed to decrease the amount of ingredients which can be deposited within the container, thereby at all times enabling the container to be completely filled.

Still further objects and features of this invention reside in the provision of a novel container that is strong and durable, simple in construction and manufacture, capable of being produced inexpensively, and especially adaptable for home use so that unused portions of paints, varnishes, foodstuffs and the like can be easily sealed substantially free of air, and which is easy to utilize.

These, together with the various ancillary objects and features of the invention which will become apparent as the following description proceeds, are attained by this collapsible container, preferred embodiments of which have been illustrated in the accompanying drawing, by way of example only, wherein.

Figure 1:
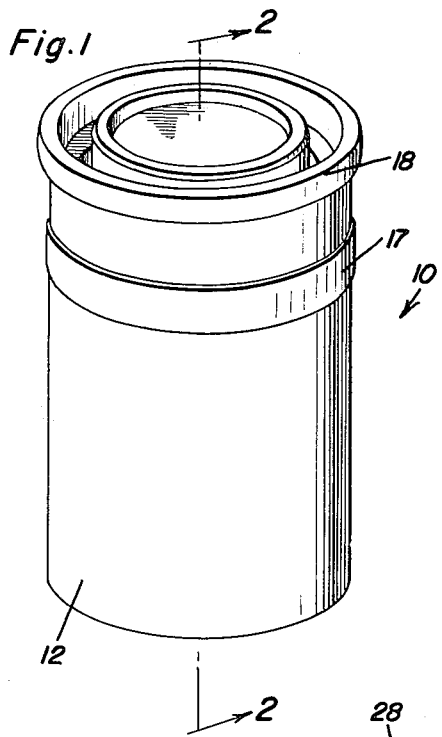
Figure 1 is a perspective view of a collapsible container constructed in accordance with the concepts of the present invention.
Figure 2:
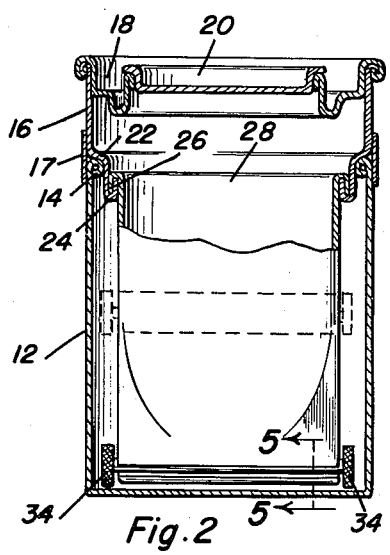
Figure 2 is a vertical sectional view as taken along the plane of line 2—2 in Figure 1.
Figure 5:
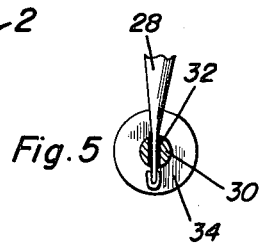
Figure 5 is a detailed sectional view as taken along the plane of line 5—5 in Figure 2 illustrating the manner in which the roller key engages the collapsible tube.

With continuing reference to the accompanying drawings wherein like reference numerals designate similar parts throughout the various views, reference numeral 10 generally designates a container constructed in accordance with the present invention. This invention includes an outer lower receptacle 12 having a rolled upper edge 14 which supports an upper outer receptacle 16 with a portion of the upper outer receptacle 16 extending downwardly into the lower outer receptacle 12. The upper outer receptacle 16 is provided with a rolled top for supporting a cover engaging member 18 on which a cover 20 may be positioned. The upper outer receptacle 16 further includes a shoulder portion 22 which engages the rolled portion 14 of the lower outer receptacle 12 as well as an inwardly turned hook-like flange 24 which is adapted to be engaged by the upper flange 26 of an inner receptacle 28.

The inner receptacle 28 is in the form of a collapsible tube formed from a fluoro-carbon or such other materials as lead, zinc or aluminum foil. The inner receptacle 28 has positioned thereon a roller key 30 which is slotted, as at 32, for reception of the lower edge of the inner receptacle 28 and knobs 34 may be provided for rolling the collapsible tube 28 upwardly. As is well known, the collapsible tubes will retain their shape generally after being rolled; and if promptly sealed by the cover 20, any deformation of the tube 28 by the unwinding thereof will cause a vacuum in the entire container.

Figure 4:
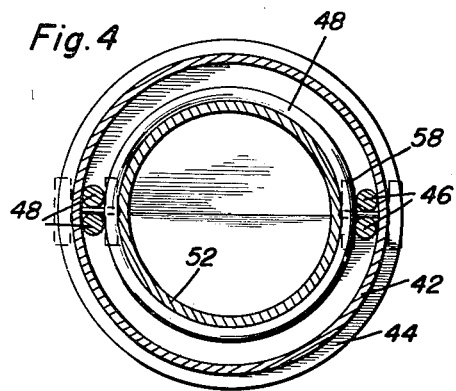
Figure 4 is a horizontal sectional view as taken along the plane of line 4—4 in Figure 3.
Figure 3:
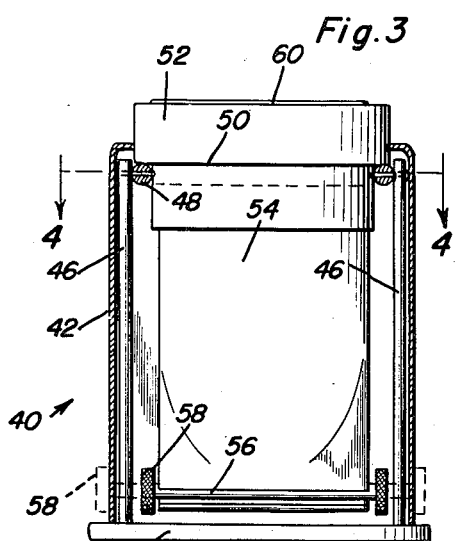
Figure 3 is a vertical sectional view of a modified form of the invention.

Referring now to the embodiment of the invention as is shown in Figures 3 and 4, it will be noted that herein the container is generally designated by reference numeral 40 and includes a lower outer container 42 which is supported by a base 44, if desired, and in which opposed sets of supports 46 are positioned. The supports 46 carry a ring 48 on which the shoulder portion 50 of an upper outer receptacle 52 is positioned with portions of the upper outer receptacle 52 extending inwardly of the lower outer receptacle 42. A collapsible tube 54 similar to the collapsible tube 28 is provided, and likewise a roller key 56 having knobs as at 58 similar to the knobs 34 is provided for collapsing the collapsible tube 54.

It is to be recognized that if desired, the outer lower container 42 can be mounted so that the key 56 can extend through with the knobs 58 in the position as is shown in phantom lines. Further, it is within the concept of the invention to arrange the supports 46 outwardly of the lower outer container 42.

The container 40 is, of course, provided with a cover, as at 60, for sealing this container, and after the contents have been poured into the inner receptacle 54, the cover can be positioned thereon sealing the container substantially free of air.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. An adjustable container comprising a lower outer receptacle, an upper outer receptacle, means supporting said upper outer receptacle with a portion of said upper outer receptacle extending into said lower outer receptacle, an inner receptacle carried by said upper outer receptacle within said lower outer receptacle, said inner receptacle comprising a collapsible tube, and a cover engaging said upper outer receptacle to seal said container, said upper outer receptacle having a hook-like flange extending about the lower peripheral edge thereof, said inner container having an upper flange engaging said hook-like flange.

2. An adjustable container comprising a lower outer receptacle, an upper outer receptacle, means supporting said upper outer receptacle with a portion of said upper outer receptacle extending into said lower outer receptacle, an inner receptacle carried by said upper outer receptacle within said lower outer receptacle, said inner receptacle comprising a collapsible tube, and a cover engaging said upper outer receptacle to seal said container, said upper outer receptacle having a hook-like flange extending about the lower peripheral edge thereof, said inner container having an upper flange engaging said hook-like flange, a pair of sets of spaced supports within said lower outer receptacle, means carried by said supports supporting said upper outer receptacle, and a roller key extending between said supports for collapsing said inner receptacle.

3. An adjustable container comprising a lower outer receptacle, an upper outer receptacle, means supporting said upper outer receptacle with a portion of said upper outer receptacle extending into said lower outer receptacle, an inner receptacle carried by said upper outer receptacle within said lower outer receptacle, said inner receptacle comprising a collapsible tube, and a cover engaging said upper outer receptacle to seal said container, said upper outer receptacle having a hook-like flange extending about the lower peripheral edge thereof, said inner container having an upper flange engaging said hook-like flange, said lower outer receptacle containing a roller key for collapsing said inner receptacle.

References Cited in the file of this patent
UNITED STATES PATENTS

| | | |
|---|---|---|
| 1,192,868 | Covington | Aug. 1, 1916 |
| 1,875,621 | Lindquist | Sept. 6, 1932 |

FOREIGN PATENTS

| | | |
|---|---|---|
| 109,222 | Switzerland | Mar. 2, 1925 |
| 101,898 | Sweden | Apr. 24, 1941 |